July 23, 1957
E. S. PEIERLS ET AL
2,800,145
BARRIER HOSE AND HOSE ASSEMBLY
Filed May 12, 1953
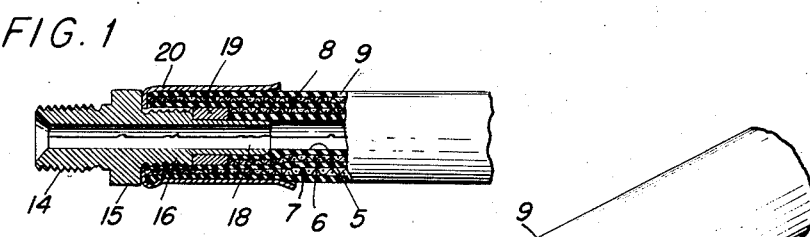
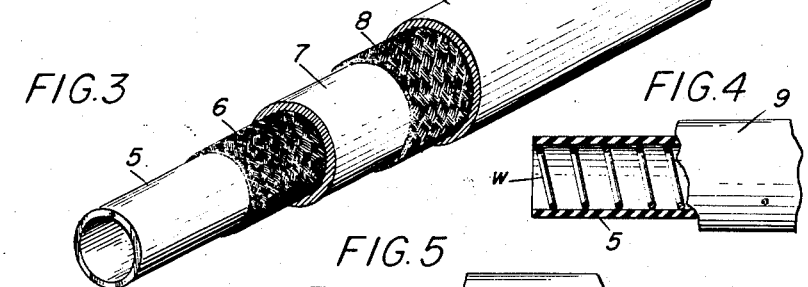
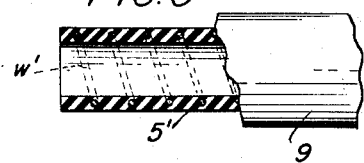
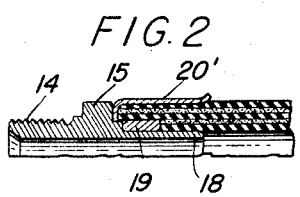
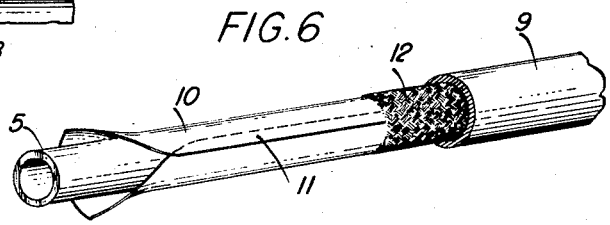
FIG. 7
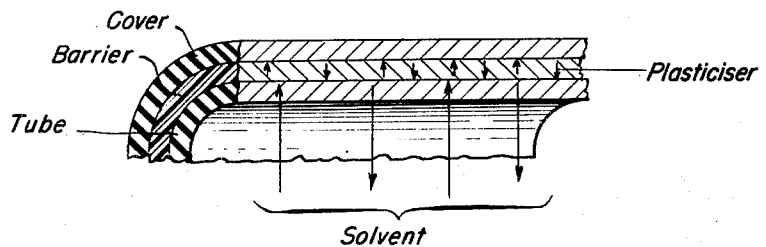
Inventors
Edgar S. Peierls
Irving D. Press
By Churchill, Frith, Weymouth & Engel
Attorneys United States Patent Office 2,800,145
Patented July 23, 1957

2,800,145

BARRIER HOSE AND HOSE ASSEMBLY

Edgar S. Peierls, Upper Montclair, and Irving D. Press, West Orange, N. J., assignors to Resistoflex Corporation, Belleville, N. J., a corporation of New York Application May 12, 1953, Serial No. 354,568

2 Claims. (Cl. 138—25)

This invention relates to flexible hose, more particularly to hose for use in conveying refrigerants of the type used in mechanical refrigeration apparatus, and to hose assemblies made therewith.

Because of the unsuitability of natural rubber and the synthetic rubber-like materials such as Neoprene for use with refrigerants such as Freons, the ordinary types of flexible hose are unsuitable for use as a conduit in refrigeration units, for which reason metal tubing has usually been used. However, there is a great need for a flexible hose for this purpose. There are various synthetic plastics which are impermeable to Freons and the like but to give them the necessary flexibility it is necessary to incorporate plasticizers. However, a tube of such plasticized material in contact with the refrigerants cannot be used because in time the refrigerant leaches out the plasticizer and the hose loses its flexibility. Moreover, some plasticizers contaminate the refrigerant, interfering with the proper action of the refrigeration mechanism.

The principal object of this invention is to provide a flexible hose for use with Freons and other fluid materials which cannot be handled in rubber and synthetic rubber hose, which retains its flexibility in use and which does not contaminate the fluid carried in it. Another object is to provide a suitable end fitting for such hose for the making of hose assemblies.

The primary aspects of the invention are: the use of a tube or liner which is inert to the fluid to be conveyed though not necessarily impermeable thereto; a surrounding jacket or barrier layer of plasticized material which is impermeable to said fluid, the tube being impermeable to the plasticizers in said jacket; and a protective outer cover which is preferably also impermeable to said plasticizers. The hose may include one or more strengthening layers of braid, which may also serve to bond the jacket to the tube and to the cover, and any other desired features of construction known in the art.

The novel features of the invention, hereinafter more particularly pointed out in the appended claims, will best be understood from the following detailed description of the present preferred embodiment thereof taken in conjunction with the drawing, in which:

Fig. 1 is a longitudinal section through a hose end fitting, the upper half of the figure showing the ferrule before crimping and the lower half showing the ferrule crimped;

Fig. 2 is a section through half of a modified end fitting before crimping;

Fig. 3 shows a section of hose with its successive layers stripped back to disclose the construction;

Fig. 4 shows in section the tube of a hose like that shown in Fig. 2 with an internal wire reinforcement;

Fig. 5 is a similar view of a modification wherein the wire reinforcement is imbedded in the tube;

Fig. 6 shows an alternate construction in which the jacket is formed from a ribbon of film applied over the tube; and Fig. 7 is a schematic diagram illustrating the principle embodied in the hose construction.

Referring to Figs. 1 and 3, 5 is the tube, 6 a first layer of braid, 7 the barrier layer or jacket, 8 a second layer of braid and 9 the cover. In Fig. 6 the barrier layer 10 is formed from a ribbon of film with its edges overlapped and sealed as shown at 11 and enclosed in a single layer of braid 12 and the cover 9. The latter construction is especially adapted for hose of smaller sizes. Instead of being laid on longitudinally, as shown in Fig. 6, strip 10 may be spirally wrapped on tube 5 or on a layer of braid first applied to the tube as shown in Fig. 3 at 6. As thus far described the hose is not of unusual construction and the methods by which it may be made are well known in the art, including the adhering of the layers of braid to the adjacent layers making up the hose wall.

The invention, in so far as the hose is concerned, resides in the specific relationship of the materials of which the several layers are made and their characteristics with respect to the fluid, either liquid or gaseous, to be conveyed, particularly the tube (which term herein designates the innermost layer) and the barrier (which term designates the layer next above it, exclusive of intervening braid if any is used adjacent the tube).

The hose invention will now be explained with reference to the diagram, Fig. 7, assuming, for purposes of illustration, that the refrigerant is one of the Freons. Synthetic rubber hose, such as Neoprene, is not significantly attacked chemically by Freon but it is somewhat permeable to it so that the refrigerant is slowly lost, for which reason such hose is unsatisfactory. Plasticized synthetic resins having the desired flexibility are known, however, which are impermeable to the Freons. One such material is compar (compounded polyvinyl alcohol). Tubing of such material is disclosed in Patent No. 2,053,-112 and its use as a tube for refrigerant hose is disclosed in Pat. No. 2,453,997. However, it has been found in practice to have certain deficiencies for this use. Polyvinyl alcohol is a hygroscopic material. Furthermore, the principal plasticizers used to give it flexibility contain water. A liner of compar in direct contact with Freon or other fluid which either extracts water from it or imparts water to it will adversely affect its properties, either causing it to harden or become too soft and lose strength. It is essential that the proper plasticizer balance be maintained. It has been found impracticable to do this with such a hose as is described in Patent No. 2,453,997. Another factor involved in the present invention is the fact that synthetic rubber such as Neoprene, is substantially impervious to water, water vapor and commonly used plasticizers.

Now, according to the invention, a hose is constructed combining these various characteristics in such a way as to meet all of the above mentioned problems. The tube, which is in direct contact with the refrigerant is, for example, made of high grade Neoprene tube stock, notwithstanding its permeability to the refrigerant. This tube is surrounded by a jacket or barrier layer of compar. Thus any refrigeration fluid permeating the tube is completely stopped by the compar, which is impermeable to it. On the other hand, the plasticizer in the compar is trapped in the barrier layer because the Neoprene tube is impermeable to it. Any water which may be present in the refrigerant is also kept away from the barrier layer by the tube for the same reason. Although the loss of plasticizer from the outer surface of the barrier is less of a problem, this possibility, as well as the possibility of water damage from the outside, can be effectively prevented by the application of any suitable waterproof cover. Preferably an outer cover such as Neoprene is used because it is also highly resistant to oil and grease and mechanical damage. The diagram of Fig. 7 illustrates the principles of this hose construction. The arrows marked "solvent" indicate the permeation of the tube, in both directions, by whatever liquid or gas may be within the tube. The arrows in the barrier layer, pointing toward the inside and outside and marked "plasticizer," indicate the entrapment of plasticizer between the tube and cover which coact to prevent its escape.

A further advantage of this construction is that it makes possible the use in the barrier layer of an increased amount of plasticizer which gives the barrier, and consequently the hose as a whole, greater flexibility. In the case of compar, this also improves the ability to retain such flexibility at higher and lower temperatures and prolongs its life.

In the diagram, Fig. 7, the layers of braid are not shown because they are not of the essence of the invention and serve a purely mechanical function. Furthermore, it will be understood that additional layers may be added for strength, appearance or the like, such as an outer layer of wire braid or whatever may be called for by the environment in which the hose is to be used. It will also be evident that the invention is not limited to the specific materials referred to above as illustrative of the underlying principles.

The above described hose construction is extremely safe. Should the tube 5 be defective or fail in service, the barrier layer 7 will prevent any loss of refrigerant; and should the barrier layer develop a defect the worst that could happen would be a very slow permeation of the other layers at one localized spot.

Because of the possibility of refrigerant permeating tube 5 and accumulating between it and the barrier layer 7, to such an extent and at such pressures that it might collapse the tube when the internal pressure is released and interfere with flow, the tube may have an internal supporting reinforcement as shown in Figs. 4 and 5. Fig. 4 shows a helical wire $w$ supporting the inner wall of tube 5. Fig. 5 shows a tube 5' having a helical wire $w'$ embedded in the wall of the tube. Either of these constructions will support the tube wall against collapse.

Referring to Fig. 1, there is shown one type of suitable fitting for use with the hose of the invention. It is provided with any siutable attaching part such as the threaded end 14, a wrench engaging portion 15 and a shouldered or stepped nipple which is inserted into the hose and having a serrated portion 16 and a portion 18 of reduced diameter which may be either smooth-surfaced or roughened. On portion 18 against the shoulder of the nipple, is a cylindrical sleeve 19 of compressible resilient material such as Neoprene containing cork particles. Outside of the hose end is a ferrule 20. In preparation for the application of the end fitting, the tube 5 and the inner layer of braid 6 are cut back, internally, by a distance equal to the combined lengths of the portion 16 and sleeve 19, so that the outer surface of sleeve 19 is in contact with the inside of barrier layer 7, which extends all the way up to the inner end of ferrule 20. When the parts have been assembled as shown in the upper half of Fig. 1, the ferrule is then radially compressed as shown in the lower half of Fig. 1 and the assembly is complete. The compressed resilient sleeve 19 effectively prevents leakage past the fitting of any fluid permeating through the tube.

Fig. 2 shows a modification of the fitting wherein the serrated portion 16 of Fig. 1 is omitted, the nipple 18' being shorter than the nipple 18 of Fig. 1, and the ferrule 20' likewise being shorter than the ferrule 20. Otherwise the assembly is like Fig. 1, like numerals referring to identical parts.

Changes in details of construction may obviuosly be made without departing from the spirit of the invention as defined in the appended claims.

What is claimed is:

1. A hose assembly comprising a synthetic rubber tube, a barrier layer of synthetic resin surrounding said tube, a layer of braid surrounding said barrier layer, and an outer cover over said braid; a fitting having a shouldered nipple inserted in the end of said hose, an elastic compressible sleeve of rubber-like material containing cork particles surrounding a portion only of said nipple and abutting said shoulder, said tube being cut back inside the hose by a distance substantially equal to the distance from the base of the nipple to the remote face of said sleeve, the end of the tube abutting the face of said sleeve, the barrier layer, braid and cover surrounding said sleeve; and a ferrule surrounding the hose end and said nipple and radially compressed thereon.

2. A hose assembly comprising a multiple layer hose and an end fitting, said fitting comprising a shouldered nipple extending into the hose, a sleeve of compressible resilient rubber-like material containing cork particles surrounding the said nipple and shorter than said nipple and abutting its shoulder, the innermost layer of said hose being cut back internally for a distance sufficient to accommodate said sleeve and abutting a face of said sleeve when fully inserted in said fitting, the remaining layers of said hose surrounding said sleeve, and a ferrule radially compressed on the portion of said hose end surrounding said nipple and said sleeve.

References Cited in the file of this patent

UNITED STATES PATENTS

| 318,458 | Fletcher | May 26, 1885 |
| 2,034,654 | Greene | Mar. 17, 1936 |
| 2,053,112 | Schnobel | Sept. 1, 1936 |
| 2,184,116 | Eastman | Dec. 19, 1939 |
| 2,196,407 | Atkinson | Apr. 9, 1940 |
| 2,383,733 | Parker | Aug. 28, 1945 |
| 2,440,339 | Langer | Apr. 27, 1948 |
| 2,448,747 | Swain | Sept. 7, 1948 |
| 2,564,602 | Hurst | Aug. 14, 1951 |
| 2,652,093 | Burton | Sept. 15, 1953 |

FOREIGN PATENTS

| 429,766 | Great Britain | June 6, 1935 |